(12) United States Patent
Hooey

(10) Patent No.: US 12,473,081 B2
(45) Date of Patent: Nov. 18, 2025

(54) AIRCRAFT WHEEL ROTATING DEVICE

(71) Applicant: James Hooey, Oshawa (CA)

(72) Inventor: James Hooey, Oshawa (CA)

( * ) Notice: Subject to any disclaimer, the term of this patent is extended or adjusted under 35 U.S.C. 154(b) by 393 days.

(21) Appl. No.: 18/122,473

(22) Filed: Mar. 16, 2023

(65) Prior Publication Data

US 2024/0308651 A1    Sep. 19, 2024

(51) Int. Cl.
*B64C 25/40* (2006.01)
*B60B 27/00* (2006.01)
*B60B 27/04* (2006.01)

(52) U.S. Cl.
CPC .......... *B64C 25/40* (2013.01); *B60B 27/0015* (2013.01); *B60B 27/0047* (2013.01); *B60B 27/04* (2013.01)

(58) Field of Classification Search
CPC ........ B64U 60/55; B64U 60/70; B64U 10/70; B64U 30/296; B64C 25/001; B64C 25/40; B64C 25/405; B64C 27/00; B64C 27/605; B64C 2027/7205; B64C 2027/7255
See application file for complete search history.

(56) References Cited

U.S. PATENT DOCUMENTS

| | | |
|---|---|---|
| 2,666,604 A | 1/1954 | Davis |
| 4,732,350 A | 3/1988 | Lamont |
| D303,106 S | 8/1989 | Macaluso |
| 6,086,017 A | 7/2000 | Al-Thani |
| 8,991,752 B2 | 3/2015 | Khal |
| 2015/0021435 A1 | 1/2015 | Abbasszadeh |
| 2020/0255130 A1 | 8/2020 | Javadzadeh |
| 2022/0227487 A1* | 7/2022 | Kopp .................... B64C 27/605 |
| 2022/0266994 A1* | 8/2022 | Gupta .................... B64C 27/605 |
| 2022/0371726 A1* | 11/2022 | Ruet ....................... B64C 27/00 |

FOREIGN PATENT DOCUMENTS

| | | | | |
|---|---|---|---|---|
| FR | 2808771 A1 | * 11/2001 | ............. | B64C 25/40 |
| GB | 2307216 | 5/1997 | | |

* cited by examiner

*Primary Examiner* — Nicholas McFall
*Assistant Examiner* — Justin Michael Heston

(57) ABSTRACT

An aircraft wheel rotating device for effecting rotation of a wheel of an aircraft prior to landing includes a mounting plate in which a plurality of holes is positioned. Respective holes are alignable with bolts of a hub of a wheel that is rotationally attached to an axle of an aircraft. The mounting plate thus is mountable to the hub. A tubular housing is attached to and extends axially from the mounting plate. Each blade of a plurality of blades is rotationally attached to the tubular housing. The blades engage an airstream to rotate the wheel about the axle. A pitch adjustment module is operationally engaged to the plurality of blades and is positioned to selectively adjust a pitch of each blade to substantially match a tangential speed of the wheel to a speed of the aircraft relative to the ground at landing.

8 Claims, 10 Drawing Sheets

12,473,081 B2

AIRCRAFT WHEEL ROTATING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

Figure 1:
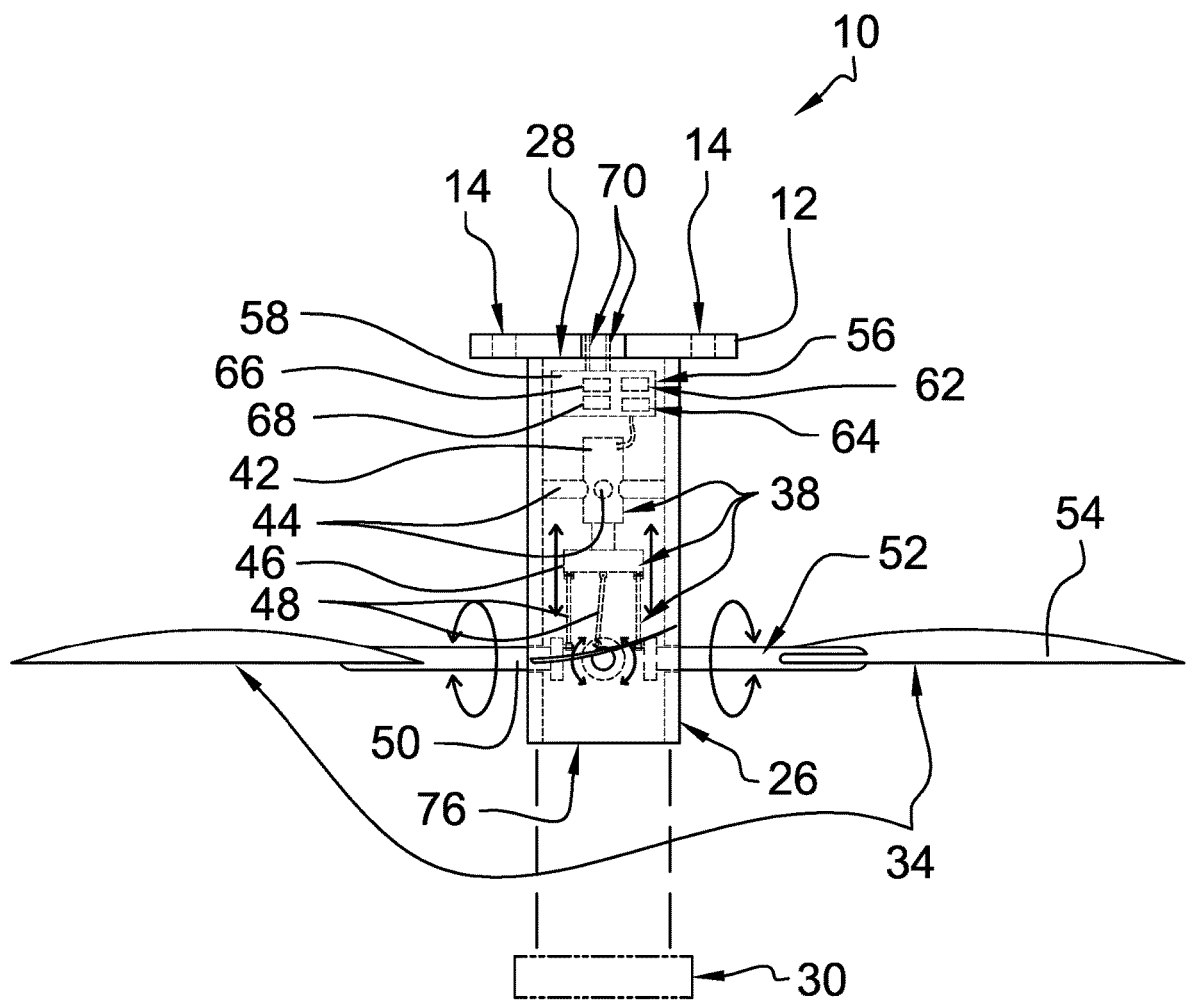

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to wheel rotating devices and more particularly pertains to a new wheel rotating device for effecting rotation of a wheel of an aircraft prior to landing. The present invention discloses a wheel rotating device comprising a plurality of pitch adjustable blades that are used to match a tangential speed of the wheel to a speed of the aircraft relative to the ground at landing.

(2) Description of Related Art Including Information Disclosed Under 37 CFR 1.97 and 1.98

The prior art relates to wheel rotating devices, which may comprise hinged flaps, fixed cup shaped vanes, fixed air foils, and selectively deployable flexible sale members, turbines, and air foils. What is lacking in the prior art is a wheel rotating device comprising a plurality of pitch adjustable blades.

BRIEF SUMMARY OF THE INVENTION

An embodiment of the disclosure meets the needs presented above by generally comprising a mounting plate in which a plurality of holes is positioned. Respective holes are alignable with bolts of a hub of a wheel that is rotationally attached to an axle of an aircraft. The mounting plate thus is configured to be mounted to the hub. A tubular housing is attached by its first terminus to and extends axially from the mounting plate. Each blade of a plurality of blades is rotationally attached to the tubular housing. The blades are configured to engage an airstream to rotate the wheel about the axle. A pitch adjustment module, which is attached to and which is positioned within the tubular housing, is operationally engaged to the plurality of blades and positioned to selectively adjust a pitch of each blade to substantially match a tangential speed of the wheel to a speed of the aircraft relative to the ground at landing.

Another embodiment of the disclosure includes an aircraft wheel rotating system, which comprises an aircraft having an aircraft wheel rotating device, according to the disclosure above, mounted to a hub of a wheel that is rotationally attached to an axle of the aircraft. In practice, each wheel comprising the landing gear of the aircraft would be fitted with an aircraft wheel rotating device.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

Figure 2:
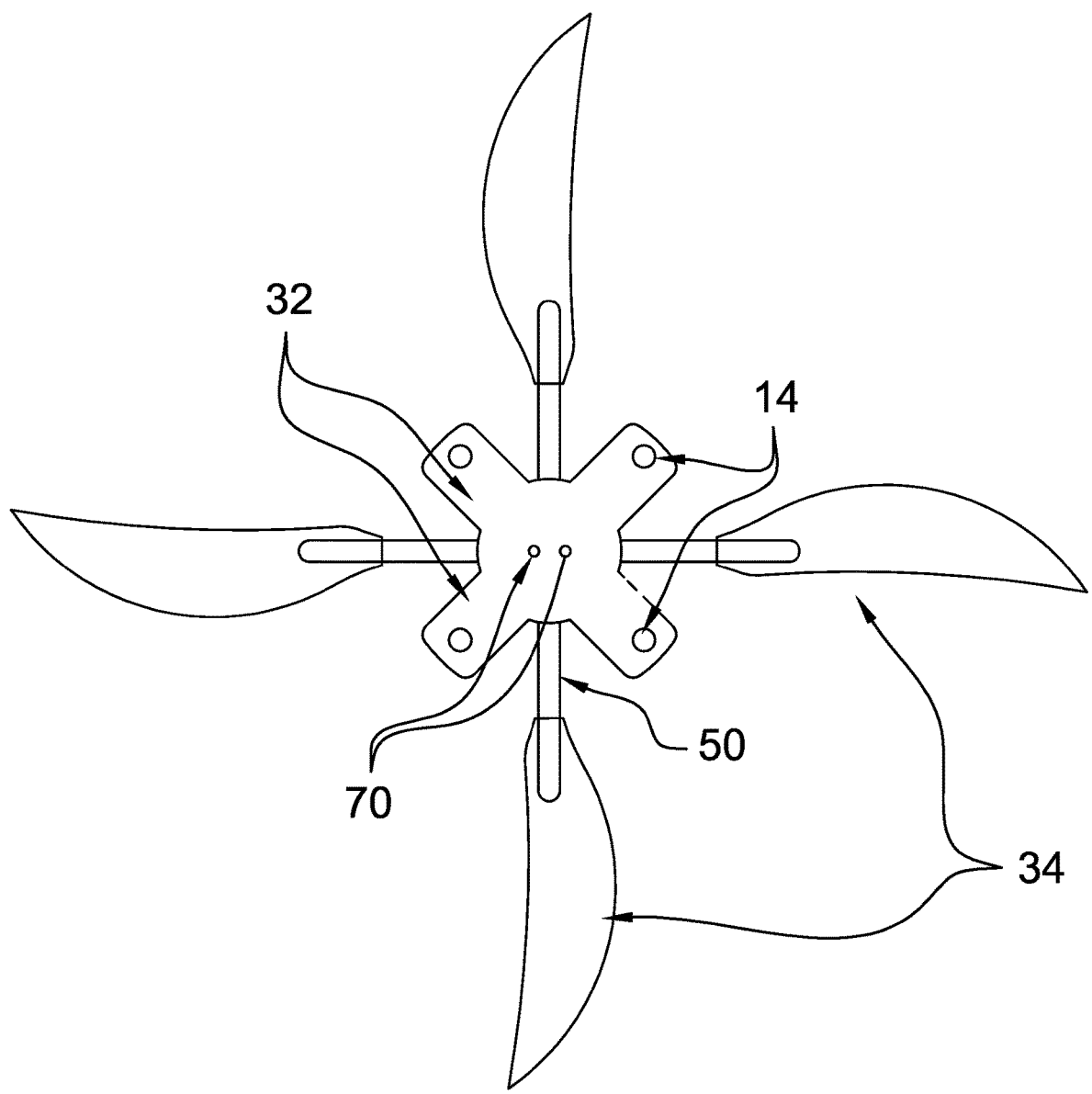
Figure 3:
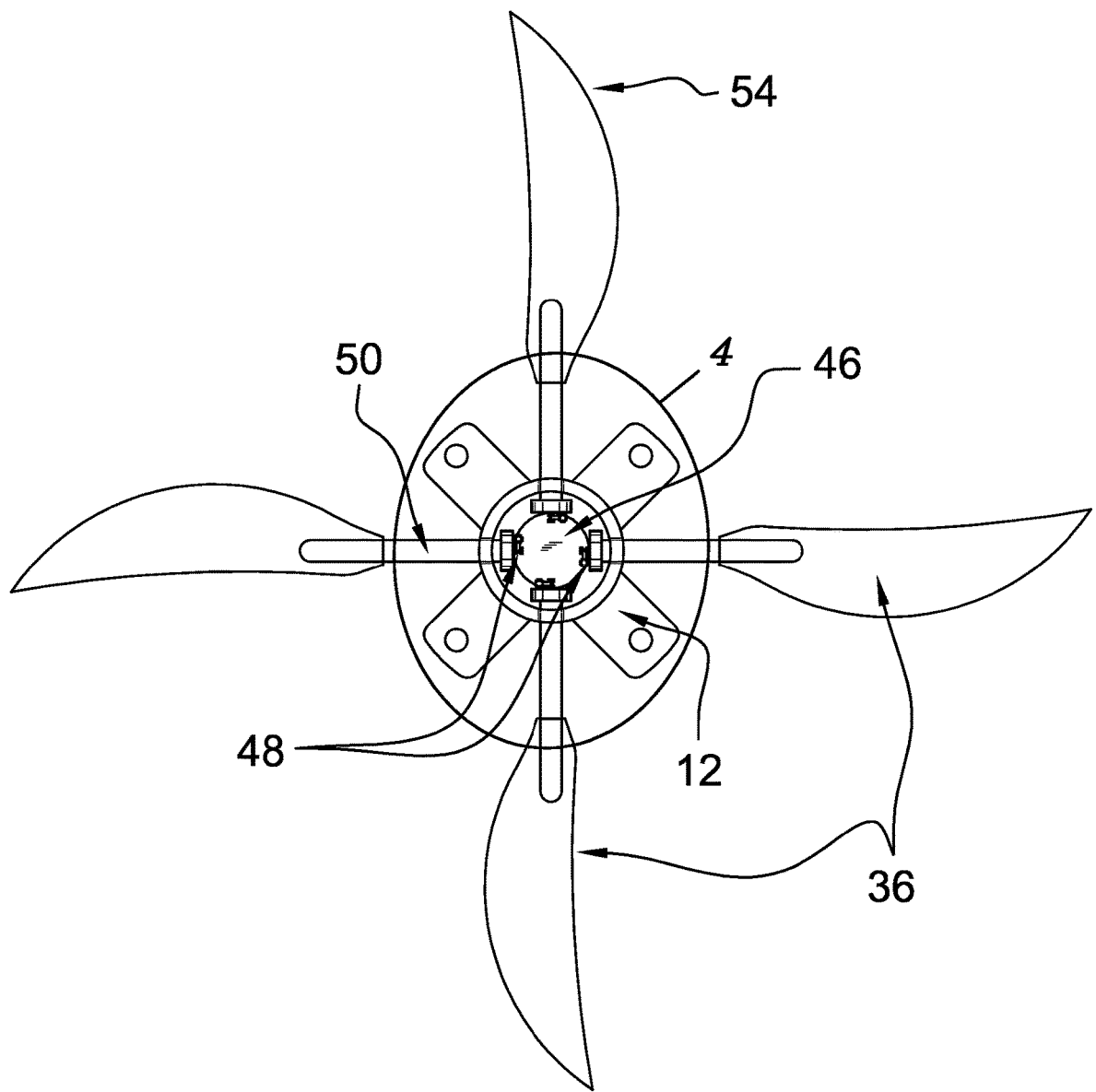
Figure 4:
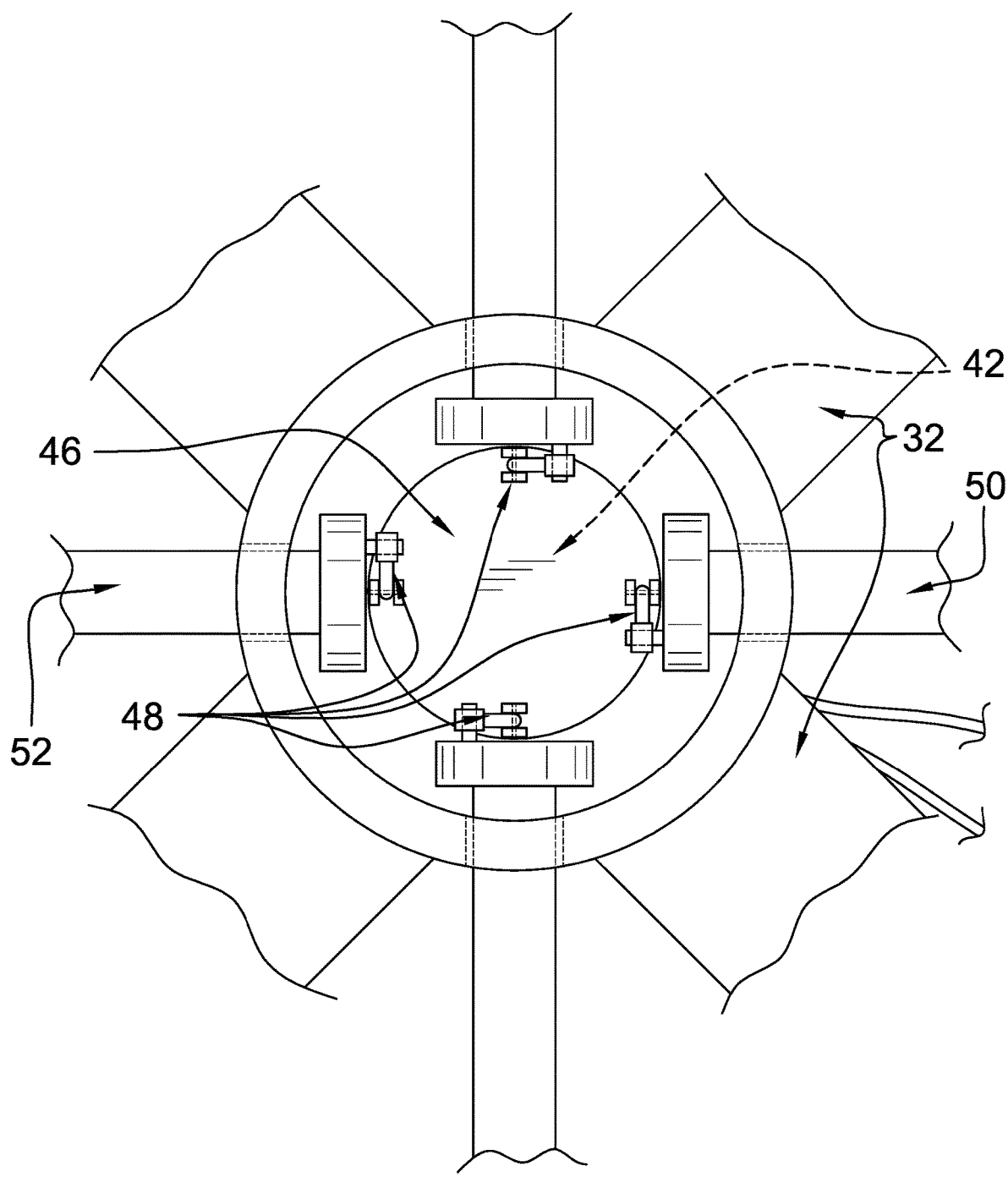
Figure 5:
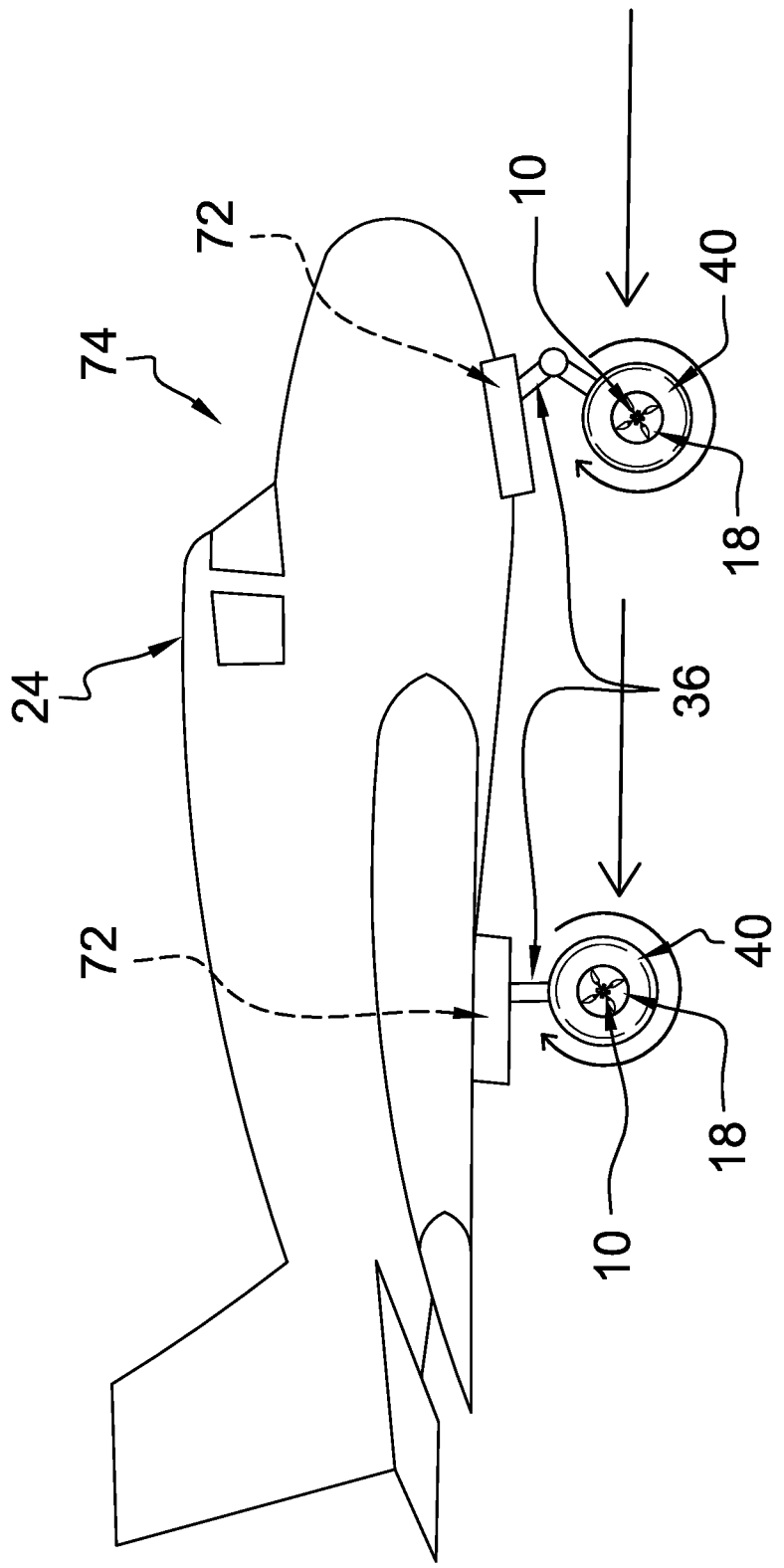
Figure 6:
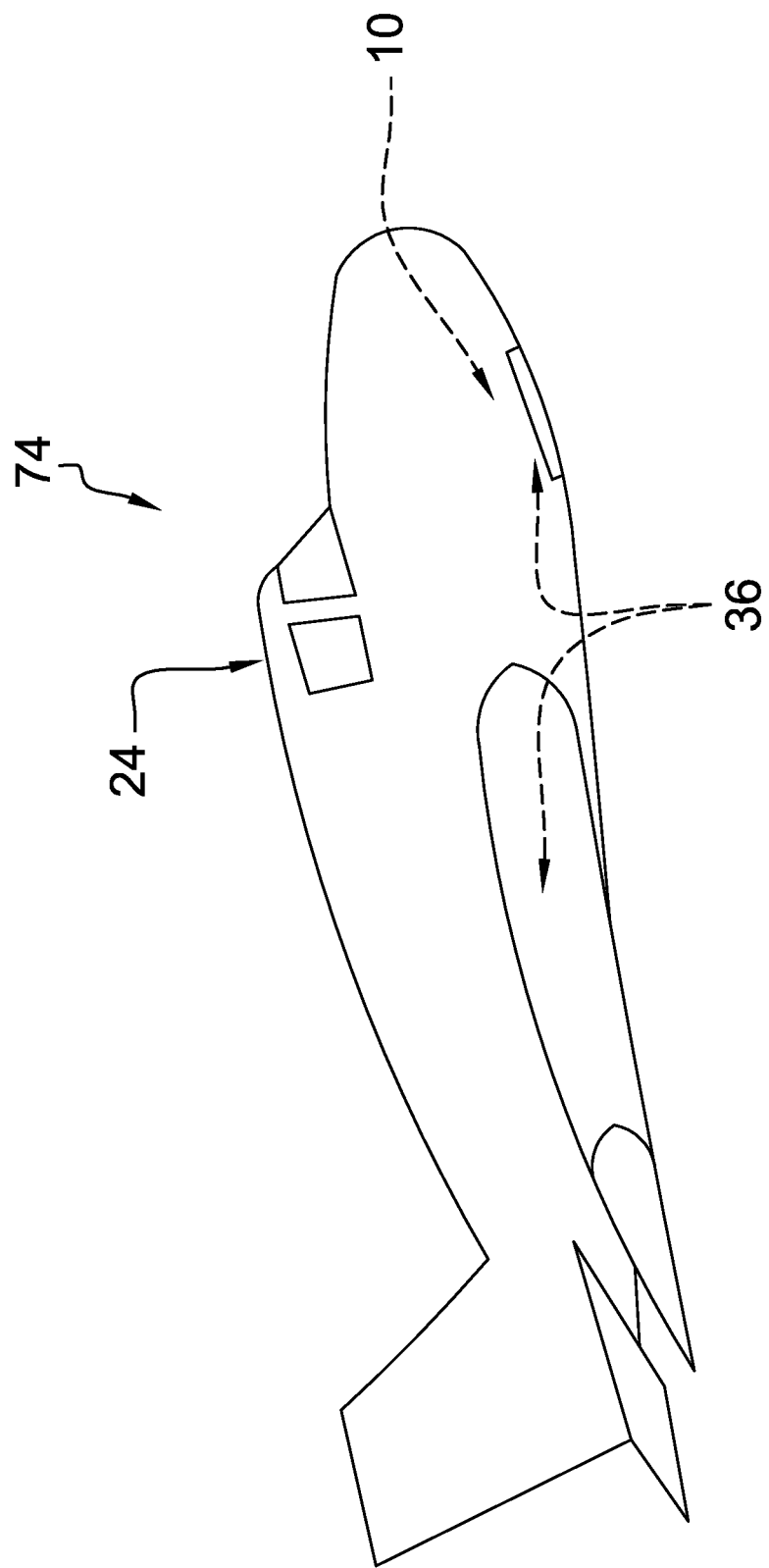
Figure 7:
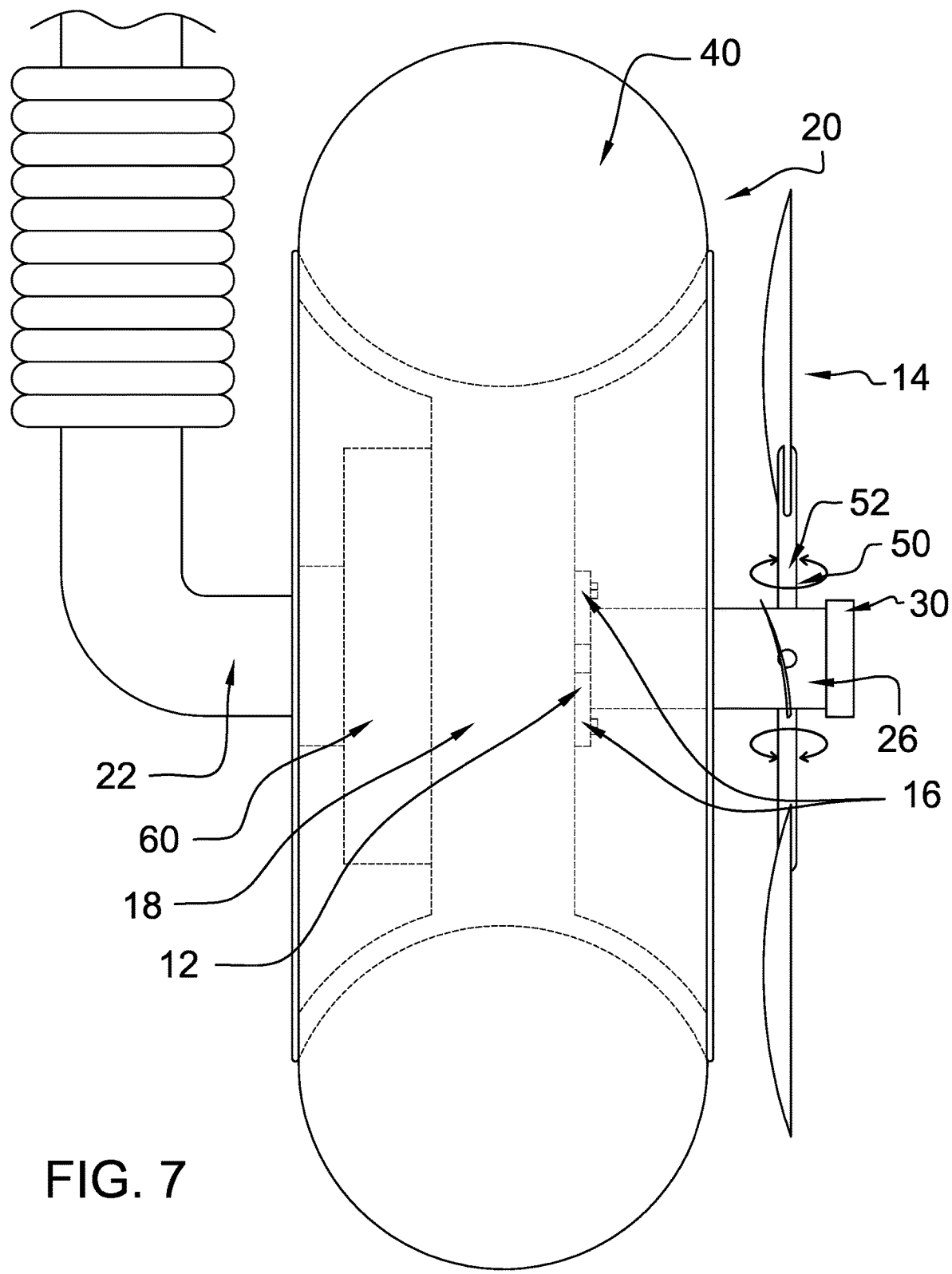
Figure 8:
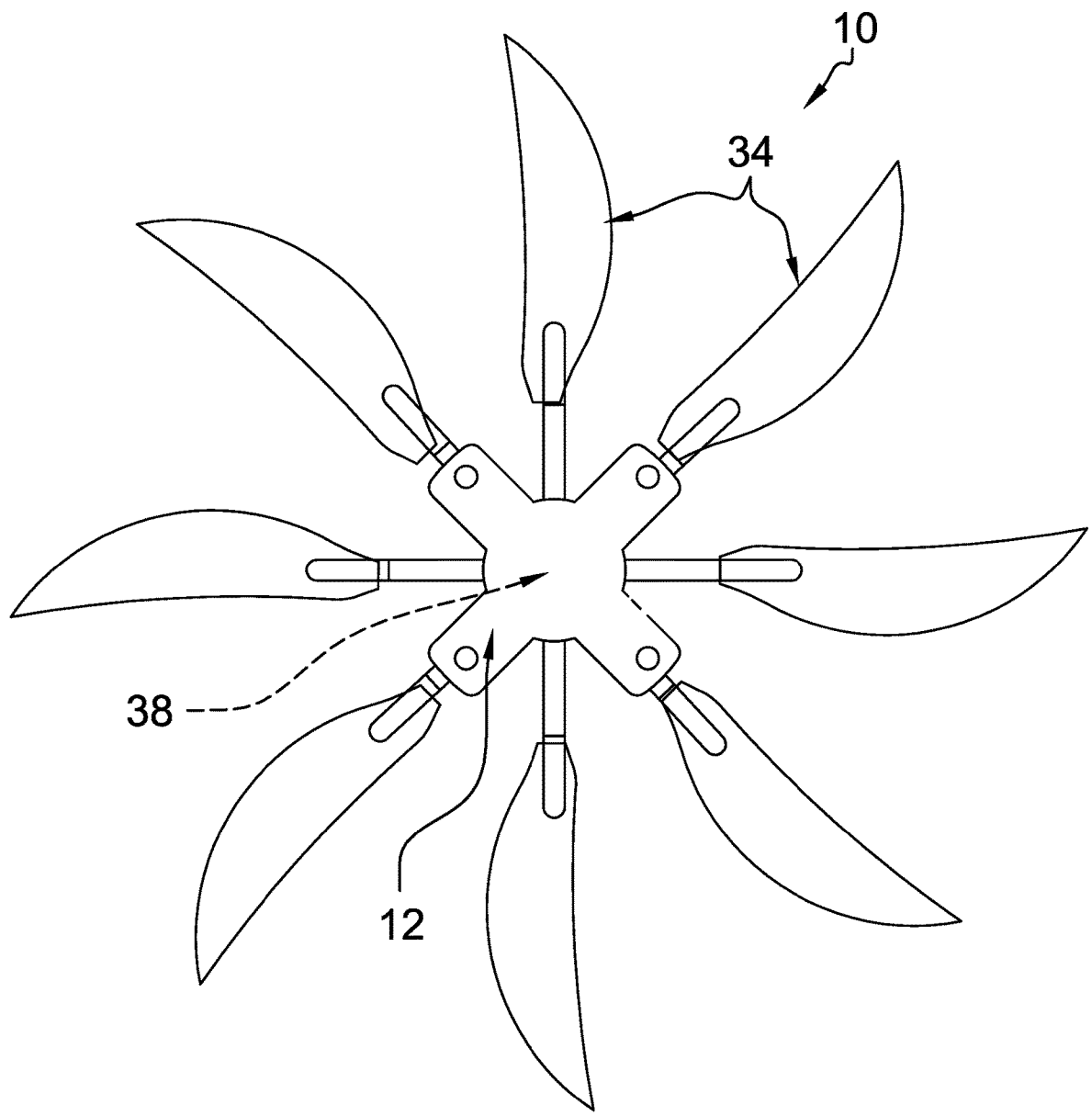
Figure 9:
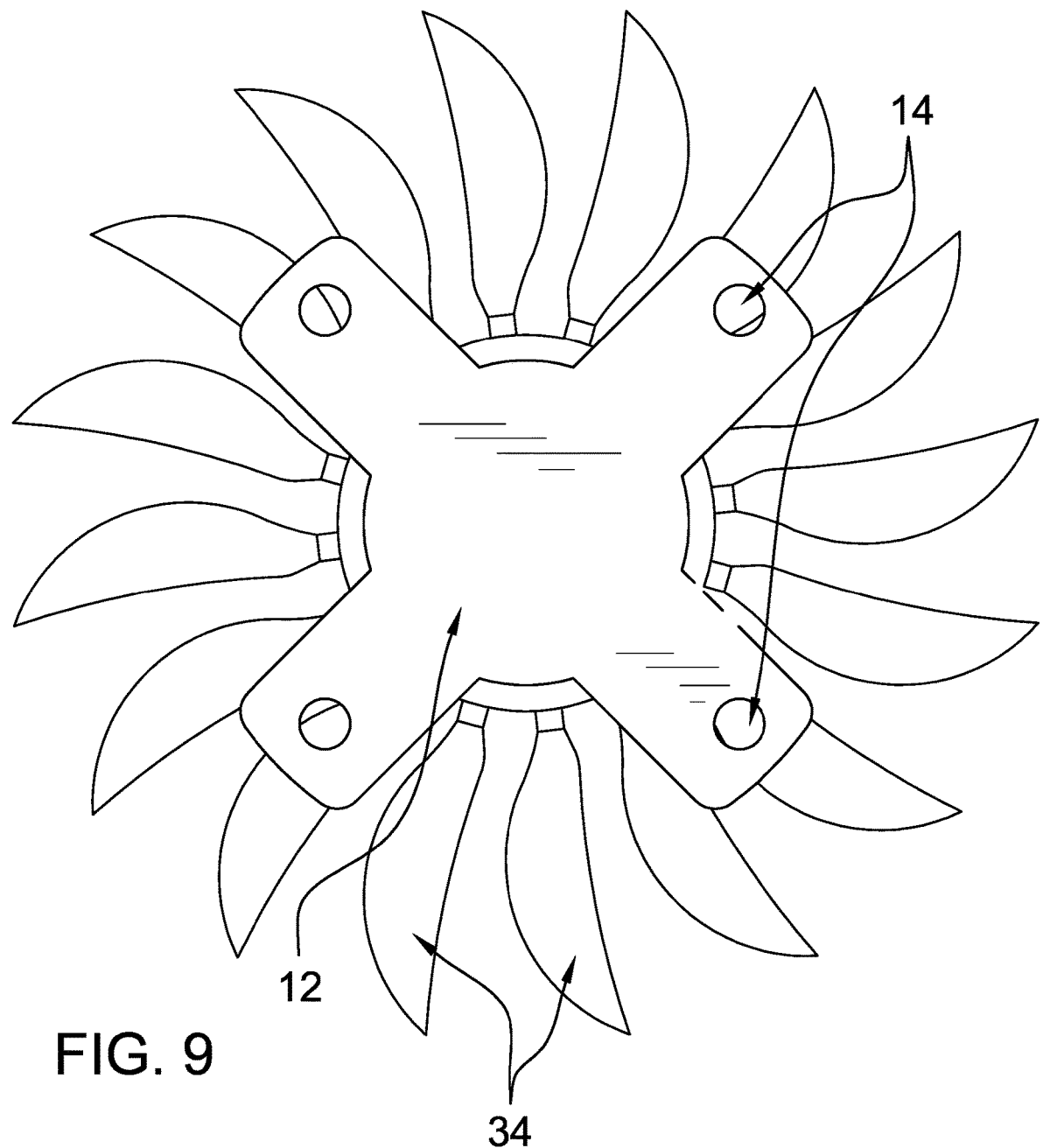
Figure 10:
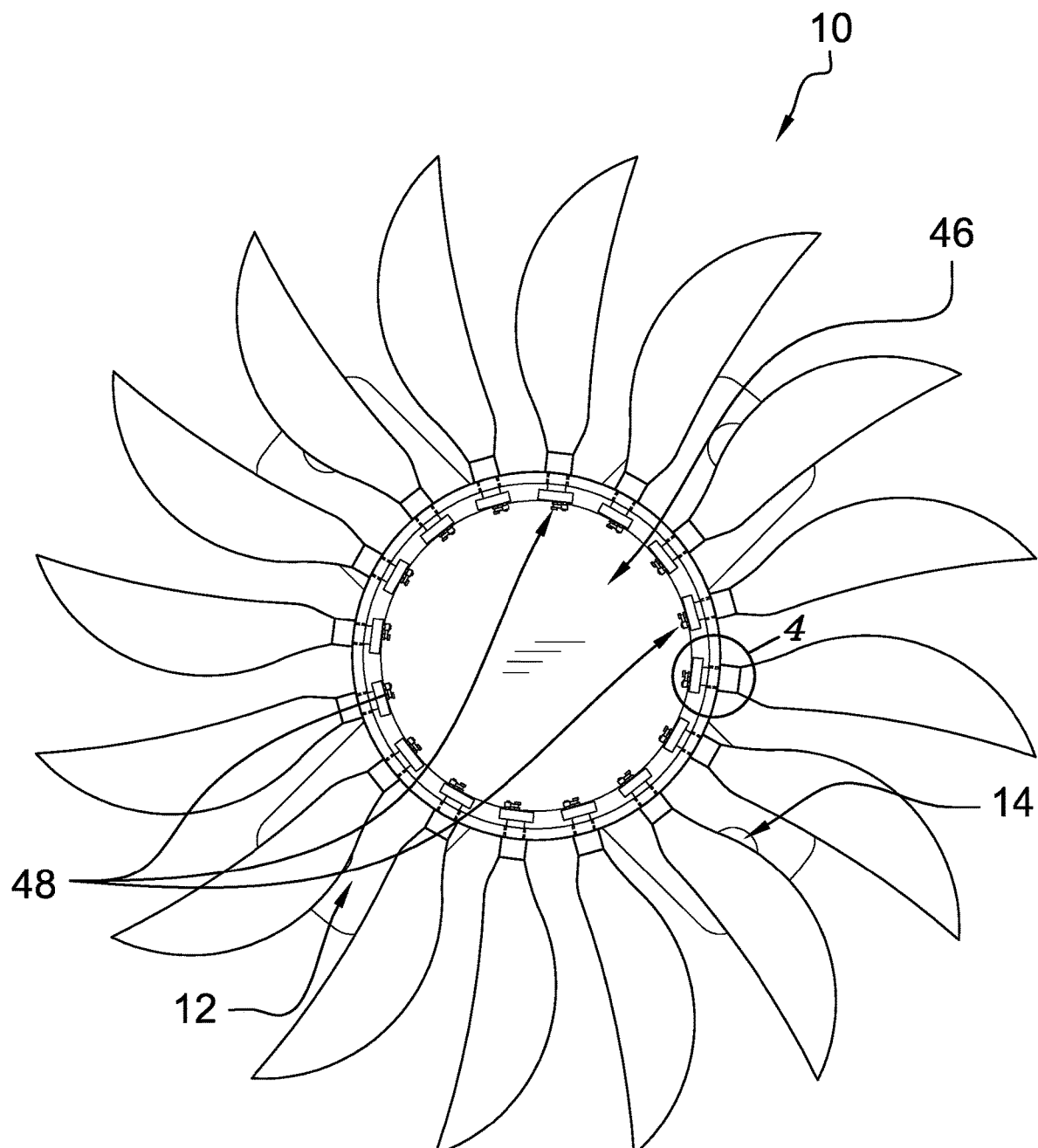

The disclosure will be better understood and objects other than those set forth above will become apparent when consideration is given to the following detailed description thereof. Such description makes reference to the annexed drawings wherein:

FIG. 1 is a top view of an aircraft wheel rotating device according to an embodiment of the disclosure.
FIG. 2 is a front view of an embodiment of the disclosure.
FIG. 3 is a rear view of an embodiment of the disclosure.
FIG. 4 is a detail view of an embodiment of the disclosure.
FIG. 5 is an in-use view of an embodiment of the disclosure.
FIG. 6 is an in-use view of an embodiment of the disclosure.
FIG. 7 is an in-use view of an embodiment of the disclosure.
FIG. 8 is a rear view of an embodiment of the disclosure.
FIG. 9 is a rear view of an embodiment of the disclosure.
FIG. 10 is front view of an embodiment of the disclosure.

DETAILED DESCRIPTION OF THE INVENTION

With reference now to the drawings, and in particular to FIGS. 1 through 10 thereof, a new wheel rotating device embodying the principles and concepts of an embodiment of the disclosure and generally designated by the reference numeral 10 will be described.

As best illustrated in FIGS. 1 through 10, the aircraft wheel rotating device 10 generally comprises a mounting plate 12 in which a plurality of holes 14 is positioned. Respective holes 14 are alignable with bolts 16 of a hub 18 of a wheel 20 that is rotationally attached to an axle 22 of an aircraft 24. The mounting plate 12 thus is configured to be mounted to the hub 18. A tubular housing 26 is attached by its first terminus 28 to and extends axially from the mounting plate 12. As shown in FIG. 1, an endcap 30 is selectively attachable to the tubular housing 26 to close a second terminus 76 of the tubular housing 26. As will become apparent, the endcap 30 being selectively attachable to the tubular housing 26 enables access to the tubular housing 26 for purposes of maintenance and repair of the aircraft wheel rotating device 10.

As shown in FIGS. 2 and 4, the mounting plate 12 may be configured as a plurality of flanges 32, with each flange 32 being attached to and extending radially from the first terminus 28 of the tubular housing 26. A respective hole 14 is positioned in each flange 32, allowing the flanges 32 to fit over the bolts 16 of the hub 18.

Each blade 34 of a plurality of blades 34 is rotationally attached to the tubular housing 26. The blades 34 are configured to engage an airstream to rotate the wheel 20 about the axle 22. As is shown in FIG. 5, the blades 34 engage the airstream when landing gear 36 of the aircraft 24 is lowered in preparation for landing. As is shown in FIG. 5, the blades 34, being attached to the hub 18, are stowed along with the wheel 20 during flight. The plurality of blades 34 comprises from two to twenty four blades 34. The plurality of blades 34 may comprise from four to sixteen blades 34. As shown in FIGS. 3, 8, and 9, the plurality of blades 34 comprises four, eight, and sixteen blades 34, respectively.

A pitch adjustment module 38, which is attached to and which is positioned within the tubular housing 26, is operationally engaged to the plurality of blades 34. The pitch adjustment module 38 is positioned to selectively adjust a pitch of each blade 34 to substantially match a tangential speed of the wheel 20 to a speed of the aircraft 24 relative to the ground at landing. The present invention is anticipated to provide a variety of benefits in operation of an aircraft 24 equipped with aircraft wheel rotating devices 10. Tires 40 of the aircraft 24 would not skid upon landing, reducing wear upon the tires 40 and associated costs. Buildup of rubber from tires 40 skidding on the runways would be reduced, thereby reducing costs associated with runway cleanup. Additionally, stability of the aircraft 24 during landing would be enhanced and risk of hydroplaning on a wet runway would be reduced.

The pitch adjustment module 38 may comprise a linear actuator 42, which is attached to and which is axially positioned within the tubular housing 26. Each support member 44 of a plurality of support members 44 is attached to and extends between the linear actuator 42 and the tubular housing 26 so that the linear actuator 42 is fixedly positioned in the tubular housing 26. A swashplate 46 is attached to the linear actuator 42 so that the linear actuator 42 extends from the swashplate 46 toward the first terminus 28 of the tubular housing 26. The linear actuator 42 is positioned to selectively motivate the swashplate 46 within tubular housing 26.

Each pivot linkage 48 of a plurality of pivot linkages 48 is attached to and extends between the swashplate 46 and a shaft 50 of a respective blade 34. The pivot linkage 48 is offset from an axis of rotation 52 of the shaft 50 so that the linear actuator 42 is positioned to selectively extend and retract the pivot linkage 48 concurrently with the swashplate 46 to reversibly position the respective blade 34 in a stowed configuration and a deployed configuration. In the stowed configuration, the respective blade 34 is oriented substantially parallel planarly to the mounting plate 12 and has minimal interaction with the airstream, whereas, in the deployed configuration, the respective blade 34 is oriented to act as an airfoil 54 and to apply torque to the hub 18, thereby causing the wheel 20 to rotate. By selectively adjusting the pitches of the blades 34, the tangential speed of the wheel 20 can be substantially matched to the speed of the aircraft 24 relative to the ground at landing.

A controller housing 56, which defines an interior space 58, is attached to and positioned within the tubular housing 26. The controller housing 56 is insulated and thus is configured to insulate the interior space 58 from heat, which is generated by a brake 60 that is operationally engaged to the wheel 20. A microprocessor 62, a tachometer 64, a receiver 66, and an electromagnet 68 are attached to the controller housing 56 and are positioned in the interior space 58. The microprocessor 62 is operationally engaged to the pitch adjustment module 38, the tachometer 64, the receiver 66, the electromagnet 68, and to a pair of electrical contacts 70, which attached to the controller housing 56. The electrical contacts 70 are configured to operationally engage the microprocessor 62 to an electrical circuit 72 of the aircraft 24.

The tachometer 64 measures rotations per minute of the wheel 20 and communicates the rotations per minute to the microprocessor 62, enabling the microprocessor 62 to calculate the tangential speed of the wheel 20. The receiver 66 is Global Positioning System enabled and thus is configured to receive positional coordinates of the aircraft 24. The receiver 66 communicates the positional coordinates to the microprocessor 62, enabling the microprocessor 62 to calculate the speed of the aircraft 24 relative to the ground and to compare this to the tangential speed of the wheel 20. The microprocessor 62 then can selectively actuate the pitch adjustment module 38 to adjust the pitches of the blades 34 to either increase or decrease the tangential speed of the wheel 20 to substantially match the speed of the aircraft 24 relative to the ground. The microprocessor 62 also is enabled to selectively actuate the electromagnet 68 to fixedly position the blades 34 of the plurality of blades 34 while in the stowed configuration.

The present invention also anticipates an aircraft wheel rotating system 74, which comprises an aircraft 24 that is fitted with an aircraft wheel rotating device 10, according to the specification above. The aircraft wheel rotating device 10 is mounted to a hub 18 of a wheel 20 that is rotationally attached to an axle 22 of the aircraft 24. In practice, each wheel 20 comprising of the landing gear 36 of the aircraft 24 would be fitted with an aircraft wheel rotating device 10.

In use, the aircraft wheel rotating device 10 is fitted to a hub 18 of a wheel 20 of an aircraft 24 and the aircraft 24 then is operated according to standard operating procedures. When the landing gear 36 is lowered prior to landing, the blades 34 interact with the airstream to rotate the wheel 20. The pitch adjustment module 38 adjusts the pitches of the blades 34, thereby adjusting torque applied to the hub 18, to substantially match the tangential speed of the wheel 20 to the speed of the aircraft 24 relative to the ground at landing.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An aircraft wheel rotating system comprising:
   an aircraft comprising a wheel, a hub of the wheel being rotationally attached to an axle;
   a mounting plate bolted to the hub;
   a tubular housing attached by a first terminus to and extending axially from the mounting plate;
   a plurality of blades, each blade of the plurality of blades being rotationally attached to the tubular housing, wherein the plurality of blades is configured for engaging an airstream for rotating the wheel about the axle;
   a pitch adjustment module attached to and positioned within the tubular housing, the pitch adjustment module being operationally engaged to the plurality of blades, such that the pitch adjustment module is positioned for selectively adjusting a pitch of each blade of the plurality of blades for substantially matching a tangential speed of the wheel to a speed of the aircraft relative to the ground at landing; and
   wherein the pitch adjustment module comprises:
      a linear actuator attached to and axially positioned within the tubular housing;
      a swashplate attached to the linear actuator, such that the linear actuator extends from the swashplate toward the first terminus of the tubular housing and such that the linear actuator is positioned for selectively motivating the swashplate within the tubular housing; and
      a plurality of pivot linkages, each pivot linkage of the plurality of pivot linkages being attached to and extending between the swashplate and a shaft of a respective blade of the plurality of blade, the pivot linkage being offset from an axis of rotation of the shaft, such that the linear actuator is positioned for selectively extending and retracting the pivot linkage concurrently with the swashplate for reversibly positioning the respective blade in a stowed configuration, wherein the respective blade is oriented substantially parallel planarly to the mounting plate, and a deployed configuration, wherein the respective blade is oriented for acting as an airfoil.

2. The aircraft wheel rotating system of claim 1, wherein the mounting plate is configured as a plurality of flanges, each flange of the plurality of flanges being attached to and extending radially from the first terminus of the tubular housing.

3. The aircraft wheel rotating system of system 11, further including an endcap selectively attachable to the tubular housing for closing a second terminus of the tubular housing.

4. The aircraft wheel rotating device of system 11, wherein the plurality of blades comprising from two to twenty four blades.

5. The aircraft wheel rotating system of system 4, wherein the plurality of blades comprising from four to sixteen blades.

6. The aircraft wheel rotating system of claim 1, further including a plurality of support members, each support member of the plurality of support members being attached to and extending between the linear actuator and the tubular housing, such that the linear actuator is fixedly positioned in the tubular housing.

7. An aircraft wheel rotating system comprising:
   an aircraft comprising a wheel, a hub of the wheel being rotationally attached to an axle;
   a mounting plate bolted to the hub;
   a tubular housing attached by a first terminus to and extending axially from the mounting plate;
   a plurality of blades, each blade of the plurality of blades being rotationally attached to the tubular housing, wherein the plurality of blades is configured for engaging an airstream for rotating the wheel about the axle;
   a pitch adjustment module attached to and positioned within the tubular housing, the pitch adjustment module being operationally engaged to the plurality of blades, such that the pitch adjustment module is positioned for selectively adjusting a pitch of each blade of the plurality of blades for substantially matching a tangential speed of the wheel to a speed of the aircraft relative to the ground at landing;
   a controller housing defining an interior space, the controller housing being attached to and positioned within the tubular housing, the controller housing being insulated, wherein the controller housing is configured for insulating the interior space from heat generated by a brake operationally engaged to the wheel;
   a microprocessor attached to controller housing, positioned in the interior space, and operationally engaged to the pitch adjustment module;
   a pair of electrical contacts attached to the controller housing and operationally engaged to the microprocessor, wherein the pair of electrical contacts is configured for operationally engaging the microprocessor to an electrical circuit of the aircraft;
   a tachometer attached to the controller housing, positioned in the interior space, and operationally engaged to the microprocessor, such that the tachometer is enabled for measuring rotations per minute of the wheel for communicating the rotations per minute to the microprocessor, enabling the microprocessor for calculating the tangential speed of the wheel; and
   a receiver attached to the controller housing, positioned in the interior space, and operationally engaged to the microprocessor, the receiver being Global Positioning System enabled, wherein the receiver is configured for receiving positional coordinates of the aircraft and enabled for communicating the positional coordinates to the microprocessor, enabling the microprocessor for calculating the speed of the aircraft relative to the ground, for comparing the speed of the aircraft relative to the ground to the tangential speed of the wheel, and for selectively actuating the pitch adjustment module for adjusting the pitches of the blades of the plurality of blades for increasing or decreasing the tangential speed of the wheel to substantially match the speed of the aircraft relative to the ground.

8. The aircraft wheel rotating system of claim 7, further including an electromagnet attached to the controller housing, positioned in the interior space, and operationally engaged to the microprocessor, such that the microprocessor is enabled for selectively actuating the electromagnet for fixedly positioning the blades of the plurality of blades in the stowed configuration.

* * * * *